(12) United States Patent
Seo

(10) Patent No.: US 12,093,349 B2
(45) Date of Patent: Sep. 17, 2024

(54) METHOD FOR DISTRIBUTING CERTIFICATE OF RIGHT TO USE DIGITAL CONTENT, AND COMPUTER PROGRAM STORED IN MEDIUM IN ORDER TO CARRY OUT METHOD

(71) Applicant: VICLIP INC., Seoul (KR)

(72) Inventor: Hyun Chul Seo, Seoul (KR)

(73) Assignee: VICLIP INC., Seoul (KR)

( * ) Notice: Subject to any disclaimer, the term of this patent is extended or adjusted under 35 U.S.C. 154(b) by 289 days.

(21) Appl. No.: 17/497,516

(22) Filed: Oct. 8, 2021

(65) Prior Publication Data

US 2022/0067125 A1 Mar. 3, 2022

Related U.S. Application Data

(63) Continuation of application No. PCT/KR2020/004893, filed on Apr. 10, 2020.

(30) Foreign Application Priority Data

Apr. 10, 2019 (KR) .......................... 10-2019-0042181

(51) Int. Cl.
*H04L 29/06* (2006.01)
*G06F 21/10* (2013.01)

(52) U.S. Cl.
CPC .................................. *G06F 21/10* (2013.01)

(58) Field of Classification Search
CPC ....................................................... G06F 21/10
(Continued)

(56) References Cited

U.S. PATENT DOCUMENTS

| 2005/0060267 A1* | 3/2005 | Inada ...................... G06F 21/10 |
| | | 705/59 |
| 2018/0115416 A1 | 4/2018 | Diehl | |
| 2018/0227293 A1* | 8/2018 | Uhr ....................... H04L 9/3268 |

FOREIGN PATENT DOCUMENTS

| CN | 105893792 A | 8/2016 |
| CN | 108734576 A | 11/2018 |

(Continued)

OTHER PUBLICATIONS

Office Action for Korean Patent Application No. 10-2023-0023189 mailed Aug. 9, 2023, all pages.

(Continued)

*Primary Examiner* — Brandon Hoffman
*Assistant Examiner* — Samuel Ambaye
(74) *Attorney, Agent, or Firm* — Kilpatrick Townsend & Stockton LLP

(57) ABSTRACT

A method of distributing a amount of issuance of digital content includes: determining the amount of issuance corresponding to a certificate of right to use digital content; generating blocks corresponding to the amount of issuance in accordance with the certificate of right to use the digital content and adding the blocks to a block chain system; generating an authentication certificate including a key value of the generated blocks in connection with the certificate of right to use the digital content; receiving a purchase request for the certificate of right to use of the digital content from a first user terminal; transmitting the digital content to the first user terminal such that the digital content is stored in a content folder of the first user terminal; transmitting a first authentication certificate corresponding to a remaining amount among the amount of issuance to the first user terminal, and storing the first authentication certificate in connection with the certificate of right to use the digital content; and transmitting a first authentication value (Continued)

included in the first authentication certificate and device information of the first user terminal to an ownership information database and updating owner information of the certificate of right to use of the digital content.

9 Claims, 12 Drawing Sheets

(58) Field of Classification Search
USPC .......................................................... 713/156
See application file for complete search history.

(56) References Cited

FOREIGN PATENT DOCUMENTS

| | | | |
|---|---|---|---|
| JP | 2005-149466 | A | 6/2005 |
| JP | 2008-198032 | A | 8/2008 |
| JP | 2017-050763 | A | 3/2017 |
| KR | 10-2002-0022283 | A | 3/2002 |
| KR | 10-2004-0028761 | A | 4/2004 |
| KR | 2014-0094909 | A | 7/2014 |
| KR | 2015-0012073 | A | 2/2015 |
| KR | 10-2015-0144645 | A | 12/2015 |
| KR | 10-2018-0112027 | A | 10/2018 |
| WO | 03/014992 | A1 | 2/2003 |
| WO | 2017/148245 | A1 | 9/2017 |
| WO | 2019/065831 | A | 4/2019 |

OTHER PUBLICATIONS

English Translation of Office Action for Korean Patent Application No. 10-2023-0023189 mailed Aug. 9, 2023, all pages.
International Search Report and Written Opinion for PCT/KR2020/004893 mailed Oct. 29, 2020, all pages.
Office Action, including Notice for Reasons for Refusal, for Japanese Patent Application No. 2021-560464 dated Nov. 10, 2022, all pages.
Office Action for Korean Patent Application No. 10-2021-0113986 mailed Oct. 16, 2022, all pages.
Office Action for Chinese Patent Application No. 202080033396.3 mailed Feb. 28, 2024, 15 pages (with English translation).
6 Office Action for Japanese Patent Application No. 2023-096244 mailed Apr. 9, 2024, 12 pages (with English translation).

* cited by examiner

METHOD FOR DISTRIBUTING CERTIFICATE OF RIGHT TO USE DIGITAL CONTENT, AND COMPUTER PROGRAM STORED IN MEDIUM IN ORDER TO CARRY OUT METHOD

CROSS-REFERENCE TO RELATED APPLICATIONS

This application is a continuation of PCT Patent Application No. PCT/KR2020/004893, filed Apr. 10, 2020 which claims priority to Korean Patent Application No. 10-2019-0042181, filed Apr. 10, 2019, the disclosures of which are incorporated by reference herein in their entireties.

TECHNICAL FIELD

The present specification discloses a method of distributing digital content as much as an amount of issuance, a server for performing the method, and a computer program stored in a medium to carry out the method.

BACKGROUND ART

Blockchain, also referred to as a transaction ledger, is a technology for preventing hacking that can occur during transactions due to a centralized server by using a decentralized algorithm. While existing financial companies keep transaction records on a centralized server, in a blockchain, a method of preventing data forgery by sending transaction details to all users participating in a transaction and verifying the details in each transaction is used. Blockchain is applied to Bitcoin, a representative online virtual currency. Bitcoin transparently records transaction details in a ledger that anyone can view, and multiple computers using Bitcoin verify the record to prevent hacking.

Blockchain is not a technology applied just to Bitcoin, but is a technology that is applied to storage of various data and has the effect of reducing the enormous cost for maintenance and security of a database (DB).

The blockchain technology allows anyone who receives a transaction sent to a network to create a block, but has a form in which a block of a node that has most quickly created a block is selected. In addition, when multiple blocks are created at a similar point in time, a chain is divided into several branches, and the blocks are synchronized with each other by deleting chains later, except for the longest chain.

DESCRIPTION OF EMBODIMENTS

Technical Problem

According to embodiments of the present disclosure, a method of distributing a certificate of right to use digital content as much as an amount of issuance, a server for performing the method, and a computer program stored in a medium to execute the method may be provided.

Solution to Problem

A method of distributing a certificate of right to use digital content as much as an amount of issuance, according to embodiments of the present disclosure, includes: determining, by a content management server, the amount of issuance of the certificate of right to use digital content; generating blocks corresponding to the amount of issuance in accordance with the certificate of right to use the digital content and adding the blocks to a block chain system, wherein the generating and the adding are performed by the content management server; generating, by the content management server, an authentication certificate including a key value of the generated blocks in connection with the digital content; receiving, by the content management server, a purchase request for the certificate of right to use of the digital content, from a first user terminal; transmitting, by the content management server, the certificate of right to use the digital content, to the first user terminal, such that the certificate of right to use the digital content is stored in a content folder of the first user terminal; transmitting a first authentication certificate corresponding to a remaining amount among the amount of issuance, to the first user terminal, and storing the first authentication certificate in connection with the certificate of right to use the digital content, wherein the transmitting and the storing are performed by the content management server; and transmitting a first authentication value included in the first authentication certificate and device information of the first user terminal to an ownership information database and updating owner information of the certificate of right to use of the digital content, wherein the transmitting and the updating are performed by the content management server.

In the present embodiment, the method may include, when a request for increasing the amount of issuance by a first amount is received, repeatedly generating a block corresponding to the authentication certificate of the certificate of right to use of the digital content, by the first amount, and generating one or more authentication certificates having a key value of the generated one or more blocks, as an authentication value.

In the present embodiment, the method may include, in response to a request to move the certificate of right to use of the digital content from the first user terminal to a second user terminal, moving the digital content, the certificate of right to use of the digital content, and the first authentication certificate stored in the first user terminal, to the second user terminal, and changing owner information of the certificate of right to use, to device information of the second user terminal.

In the present embodiment, the method may include generating blocks corresponding to the amount of issuance of the certificate of right to use of the digital content and synchronizing the generated block information on a distribution system by changing a state of the generated blocks to general blocks.

In the present embodiment, the method may include, when a load request for the digital content is received from the first user terminal, transferring the first authentication certificate linked with the certificate of right to use of the digital content to a block chain system and receiving information on whether there is a block corresponding to the first authentication certificate, and when there is no block corresponding to the first authentication certificate, processing the digital content not to be played.

In the present embodiment, the method may include, when a request for determining whether the digital content is illegally copied is received from the second user terminal, transmitting a first authentication certificate linked with the digital content, to the block chain system, and receiving information regarding whether there is a block corresponding to the first authentication certificate and transmitting the information to the second user terminal.

In the present embodiment, the method may include generating a plurality of authentication certificates corresponding to the amount of issuance of the certificate of right to use the digital content, as blocks, and determining whether the digital content is illegally copied by using a uniquely generated key value through the generated blocks.

A computer program according to an embodiment of the present disclosure may be stored in a medium to execute any one of the methods according to the embodiments of the present disclosure by using a computer.

Moreover, a computer-readable recording medium having recorded thereon a computer program for executing other methods, other systems, and the method for implementing the present disclosure is further provided.

In addition to the aforesaid details, other aspects, features, and advantages will be clarified from the following drawings, claims, and detailed description.

Advantageous Effects of Disclosure

According to embodiments of the present disclosure, the amount of issuance of a certificate of right to use digital content may be controlled by using a block of a block chain which cannot be forged or falsified, and distribution of invalid digital content and certificates of right to use may be prevented.

MODE OF DISCLOSURE

Figure 1:
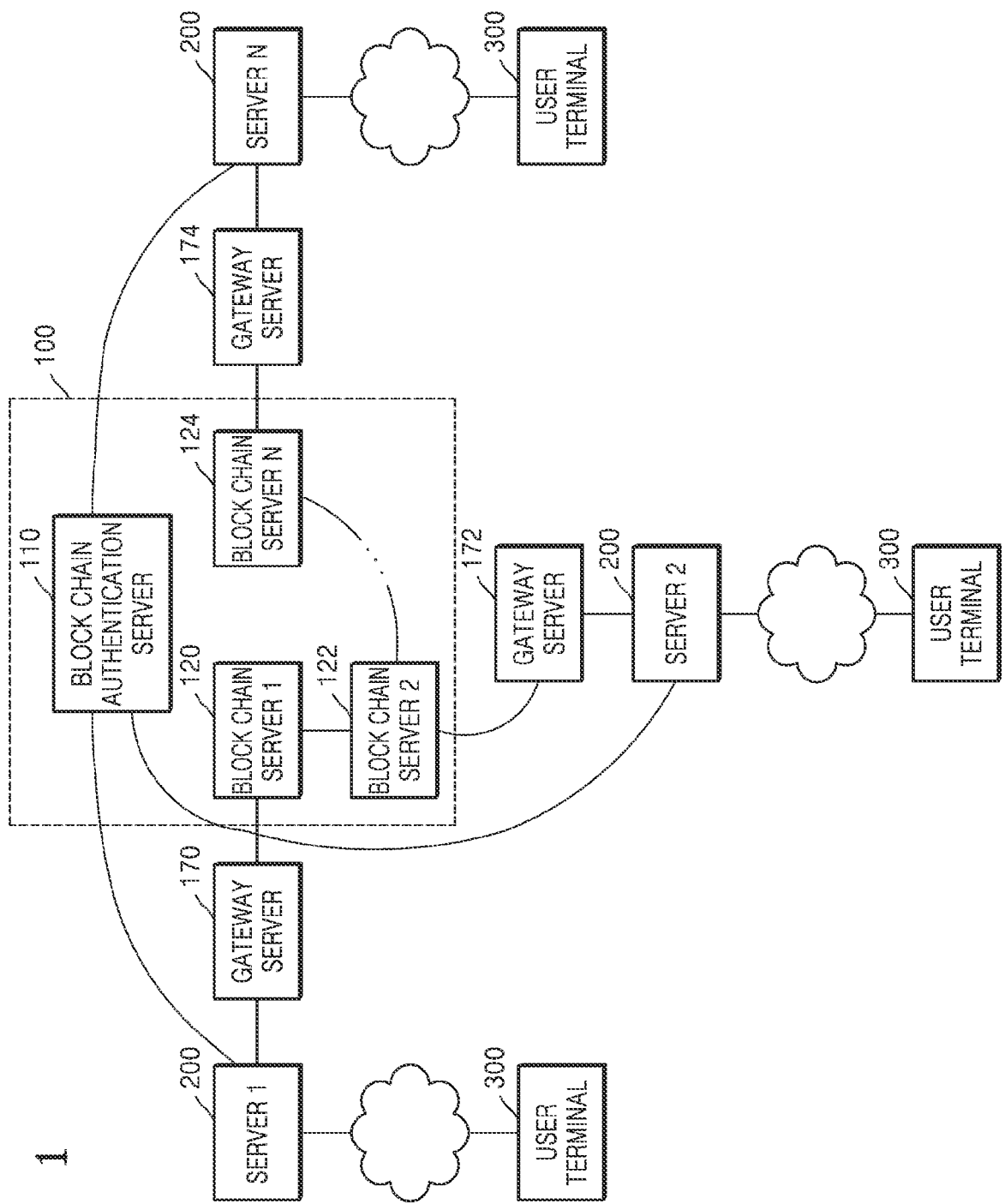
FIG. 1 is a diagram illustrating a schematic structure of an entire system to which a content use right management method using a block chain according to embodiments of the present disclosure is applied.

As the present disclosure allows for various changes and numerous embodiments, particular embodiments will be illustrated in the drawings and described in detail in the written description. The effects and features of the present disclosure, and ways to achieve them will become apparent by referring to embodiments that will be described later in detail with reference to the drawings. However, the present disclosure is not limited to the following embodiments but may be embodied in various forms.

Hereinafter, various embodiments will be described in detail with reference to the drawings. The embodiments described below may be modified and implemented in various different forms. In order to more clearly describe the characteristics of the embodiments, detailed descriptions of details that are widely known to those of ordinary skill in the art to which the following embodiments belong will be omitted.

In the present specification, when a constituent element "connects" or is "connected" to another constituent element, the constituent element can be directly connected to the other element, or it can be connected to the other element and 'an intervening element may be present.' Also, when a constituent element may "include" another constituent element, unless specified otherwise, it may not be construed to exclude another constituent element but may be construed to further include other constituent elements.

It will be understood that, although the terms 'first, second,' etc. may be used herein to describe various elements, these elements should not be limited by these terms. These terms are only used to distinguish one element from another.

In the present specification, a "blockchain" may refer to a distributed P2P (Peer to Peer) system of a ledger in which software elements are used, the software elements consisting of an algorithm in which blocks connected in order in order to secure and maintain integrity negotiate service usage history information by using encryption techniques and security technology. Here, the distributed P2P system may be a special form of a distributed system. In addition, in a P2P system, all nodes in a network may provide resources (processing power, storage space, data or network bandwidth, etc.) to each other without the coordination of a central node. In addition, a "blockchain" may refer to a distributed ledger technology in which a ledger recorded with usage history information is distributed in a P2P network rather than a central server of a certain institution and nodes in the network jointly record and manage the information.

In the present specification, a "terminal" may refer to a smartphone, a tablet PC, a PC, a TV, a smart TV, a mobile phone, a PDA (personal digital assistant), a laptop, a non-mobile computing device, or the like, but is not limited thereto.

In the present specification, a "node" may refer to a component within a network of a blockchain. For example, a node may be a special-purpose computer, a general-purpose computer, a supercomputer, a mainframe computer, a personal computer, a smartphone, a tablet PC, and the like, but is not limited thereto.

FIG. 1 is a diagram illustrating a schematic structure of an entire system to which a content use right management method using a block chain according to embodiments of the present disclosure is applied.

Referring to FIG. 1, an online service system includes a block chain system 100 consisting of a block chain authentication server 110 and a plurality of block chain servers 120, 122, and 124, a content management server 200, and gateway servers 170, 172, and 174 that connect the content management server 200 to the block chain system 100. User terminals 301, 302, and 303 are connected to the content management server 200 through a wired/wireless communication network. The content management server 200 may be a server corresponding to at least one of a server 1 200, a server 2 200, a server N 200 of FIG. 1. The server 1 200, the server 2 200, and the server N 200 perform the same function as the content management server 200 described herein and may include the same components. The content management server 200 may be distributed to the server 1 200, the server 2 200, the server N 200, and the like.

The content management server 200 is a server that provides a content management service. For example, the content management server 200 is a server that stores and manages owner information, ownership numbers, authentication certificates, issuance information, distribution information, etc. of digital content, and may exist in a variety of forms according to embodiments. The content management server 200 may be an existing system used to provide a content management service, and the existing system is referred to as a legacy system. Here, digital content may refer to contents such as pictures, pictorials, sound sources, webtoons, web novels, dramas, movies, event contents, tickets, travel products, and airline tickets, but is not limited thereto, and may include contents in an electronic file format. Digital content correspond to tangible goods may be also be issued.

The content management server 200 may receive a request for issuing a certificate of right to use digital content, from the user terminals 301, 302, and, 303. In response, the content management server 200 may access the block chain system 100 and transmit a request for generating one or more blocks corresponding to the certificate of right to use. The certificate of right to use refers to a file of a certificate related to the right to use a certain digital content or a plurality of digital contents. The certificate of right to use may include digital content, owner information about the digital content, issuance information, distribution information, and the like. The details of a certificate of right to use may be encrypted by using a certain encryption method. Here, values stored in a block may be used to encrypt a certificate of right to use. The content management server 200 may manage an authentication certificate linked with a certificate of right to use digital content, by using a block chain system. The content management server 200 may determine, by using the block chain system, the validity of digital content, the validity of a certificate of right to use the digital content, the validity of an authentication certificate of the certificate of right to use, and/or the validity of an account.

The block chain authentication server 110 is an authentication server connected to the block chain system 100, and the block chain servers 120, 122, and 124 generate an authentication certificate to verify the validity of a certificate of right to use digital content or an authentication certificate of the certificate of right to use.

According to embodiments of the present disclosure, the block chain authentication server 110 may receive a request for generating a block corresponding to digital content, from the content management server 200. In response to the request from the content management server 200, a block corresponding to an authentication certificate of a certificate of right to use may be generated, and a key value assigned to the generated block may be transmitted to the content management server 200.

According to the embodiments of the present disclosure, when the block chain authentication server 110 receives the request for generating a block corresponding to digital content from the content management server 200, the block chain authentication server 110 may transmit the request to one of the block chain servers 120, 122, and 124. One of the block chain servers 120, 122, and 124 generates a block corresponding to the authentication certificate of the certificate of right to use in response to the request from the content management server 200, and may transmit a key value assigned to the generated block to the content management server 200 via the block chain authentication server 110.

The block chain authentication server 110 may be implemented as a portion of the block chain servers 120, 122, and 124 constituting the block chain system 100, or may be implemented as a structure connected to the block chain servers 120, 122, and 124. The block chain authentication server 110 may verify the validity of an account, a certificate of right to use digital content and/or an authentication certificate, and may perform various methods according to the related art, as a method of verifying the validity.

The gateway servers 170, 172, and 174 transmit and receive data between the content management server 200 and the block chain system 100. The content management server 200 may transmit a request for generating a block corresponding to the digital content to the block chain system 100 via the gateway servers 170, 172, and 174. The key value of the block generated in the block chain system 100, or the like, may be received by the content management server 200 via the gateway servers 170, 172, and 174. When a format or protocol of data used in the content management server 200 is different from a format or protocol of data used in the block chain system 100, the gateway servers 170, 172, and 174 may deform the data to fit the content management server 200 or the block chain system 100. Various methods according to the related art, for converting data between heterogeneous networks or heterogeneous systems may be applied to the gateway servers 170, 172, and 174.

The gateway servers 170, 172, and 174 may receive and store a block key value from the block chain authentication server 110. When a user logs in the gateway servers 170, 172, and 174, the gateway servers 170, 172, and 174 may verify the validity of a user account (ID) through the block chain authentication server 110. The gateway servers 170, 172, and 174 may transmit a block key value in response to a request from the content management server 200 or the user terminal 300.

Although the gateway servers 170, 172, and 174 are illustrated between each content management server 200 and the block chain system 100 in the present embodiment, various modifications may be made according to embodiments; for example, the gateway servers 170, 172, and 174 may be implemented as a portion of the block chain servers 120, 122, and 124, or as a portion of the content management server 200.

The block chain servers 120, 122, and 124 are designed to distribute and store, in a block chain, a key value of an authentication certificate corresponding to a certificate of right to use digital content. The key value of the authentication certificate may be a key value generated as a result of generating a block. Alternatively, the key value of the authentication certificate may be a value generated using a key value generated as a result of generating a block. Since the configuration for storing data in a block chain like the conventional Bitcoin is well-known, a description of a specific method for storing data in the block chain will be omitted. The block chain servers 120, 122, and 124 may transmit a result of processing a transaction to the content management server 200 through the gateway servers 170, 172, and 174.

Figure 2:
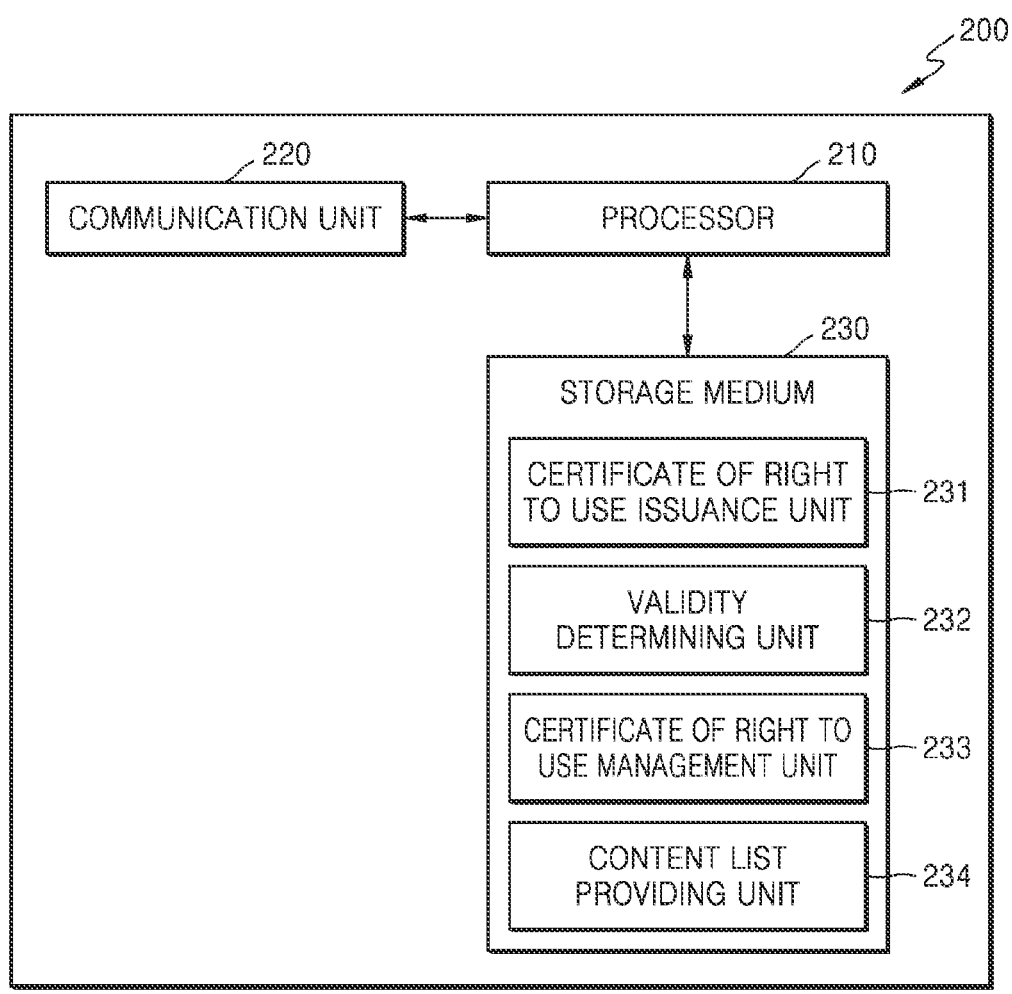
FIG. 2 is a block diagram of a content management server according to embodiments of the present disclosure.

FIG. 2 is a block diagram of the content management server 200 according to embodiments of the present disclosure.

As illustrated in FIG. 2, the content management server 200 may include a processor 210, a communication unit 220, and a storage medium 230. However, not all illustrated components are essential components. The content management server 200 may be implemented by more components than the illustrated components, and the content management server 200 may be implemented by fewer components than the illustrated ones. Hereinafter, the components will be described. A node illustrated in FIG. 1 may include the same components as those of the content management server 200.

According to some embodiments, the communication unit 220 may communicate with an external device. In detail, the communication unit 220 may be connected to a network in a wired or wireless manner to communicate with an external device. The external device may include nodes on a block chain network, an operator's terminal.

The communication unit 220 may include a communication module which supports one of various wired and wireless communication methods. The communication module may be a short-range communication module or a wired communication module.

According to some embodiments, the storage medium 230 may include at least one type of storage medium among a flash memory type, a hard disk type, a multimedia card micro type, a card type memory (SD, XD memory, etc.), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, a magnetic disk, an optical disk. The storage medium 230 may store at least one program for executing an operating method of the content management server 200 in a computer. At least one program stored in the storage medium 230 may be classified into a plurality of modules according to functions.

According to some embodiments, the processor 210 controls the overall operation of the content management server 200, and may include at least one processor such as a CPU. The processor 210 may include at least one specialized processor corresponding to each function or may be an integrated processor.

According to some embodiments, the processor 210 may execute a program stored in the storage medium 230, read data or files stored in the storage medium 230, or store a new file in the storage medium 230. Also, the processor 210 may execute instructions stored in the storage medium 230.

The storage medium 230 may include a certificate of right to use issuance unit 231, a validity determining unit 232, a certificate of right to use management unit 233, and a content list providing unit 234.

Upon receiving a request for issuing a certificate of right to use digital content, the certificate of right to use issuance unit 231 may issue the certificate of right to use digital content as much as an amount of issuance. The certificate of right to use contains data about digital content.

The certificate of right to use issuance unit 231 may access a block chain system to generate and add as many blocks as the amount of issuance of the certificate of right to use digital content. The certificate of right to use issuance unit 231 may receive key values of the added blocks, and generate authentication certificates corresponding to the certificate of right to use, including the key values of the blocks. The authentication certificates may be generated as much as the amount of issuance of the certificate of right to use digital content and managed in connection with the certificate of right to use digital content. The authentication certificates may be used to determine the validity of digital content and/or a certificate of right to use the digital content.

The certificate of right to use issuance unit 231 may control to repeatedly generate a block corresponding to an authentication certificate of the certificate of right to use digital content by a first amount when a request for additional issuance of the certificate of right to use is received, and generate authentication certificates including a key value of the generated one or more blocks as an authentication value. The block corresponding to the authentication certificate of right to use may be generated in the block chain system, but is not limited thereto. The generated authentication certificates may be delivered according to distribution of digital content and/or a package of digital content. An authentication certificate, for which there is no corresponding block, may be determined as an invalid authentication certificate. When content is damaged during a distribution process, the certificate of right to use issuance unit 231 may determine the validity of an authentication certificate thereof and regenerate valid content.

The validity determining unit 232 may determine the validity of the certificate of right to use digital content by using the certificate of right to use digital content and the authentication certificate. The validity determining unit 232 may transmit data including an authentication value included in the authentication certificate to the block chain system, and receive information about whether a block having a key value corresponding to the authentication value exists. The validity determination unit 232 may determine the validity of the certificate of right to use digital content according to whether there is the block The digital content(s) of the valid certificate of right to use may be determined to be valid ones which are not illegally created or illegally traded.

The validity determining unit 232 may receive an account and a certificate of right to use digital content from a user terminal and determine the validity of the account and the validity of the certificate of right to use digital content.

When a request for a certificate of right to use digital content is received, the certificate of right to use management unit 233 may process the request. When a purchase request for a certificate of right to use digital content is received, the certificate of right to use management unit 233 may process the request such that one or more digital contents, a certificate of right to use digital content, and authentication certificate are transmitted to the user terminal, and the one or more digital contents, the certificate of right to use digital content, and the authentication certificate are stored in a content storage area of the user terminal. When the purchase request for the certificate of right to use is received, the certificate of right to use management unit 233 may determine whether there is a remaining amount of the certificate of right to use among the amount of issuance. When there is a remaining amount, the certificate of right to use management unit 233 may manage digital content and a certificate of right to use for digital content to be distributed.

When a request such as purchase or transfer is received, the certificate of use management unit 233 may update owner information of the certificate of right to use digital content. The digital content management unit 233 may determine the validity of an account of a sender of the request, and control only a request for a certificate of right to use digital content from a valid account to be processed. The validity of an account may be determined based on whether there is a block corresponding to that block. The corresponding block may exist in a block chain system, but is not limited thereto, and may also be stored in a database. The certificate of use management unit 233 may transmit the user's account and data related to the user's account to the block chain system and receive from the block chain system information about whether a block corresponding to the account exists.

The certificate of right to use management unit 233 does not directly store or manage certificates of right to use and/or authentication certificate of the distributed digital content. The certificate of right to use and/or the authentication certificate may be stored in a user terminal of the owner of the digital content. That is, an authentication certificate transmitted to another user terminal by a purchase request may be implemented to be permanently removed from a memory of a user terminal of a previous owner.

When a request to change the owner of a certificate of right to use digital content (e.g., a transfer request or a movement request, etc.) is received, the certificate of use management unit 233 may transmit the request to an ownership information database to update owner information of the certificate of right to use digital content (device information of the owner or the owner's user terminal). The certificate of right to use management unit 233 moves a certificate of right to use digital content and/or a first authentication certificate stored in the first user terminal to a second user terminal, which is a transferee. According to the movement command, the certificate of right to use management unit 233 may completely remove the digital content, the certificate of right to use digital content, and/or the first authentication certificate, from the first user terminal.

When a request to load digital content is received from the user terminal, the certificate of use management unit 233 may transmit an authentication certificate linked with the certificate of right to use digital content, to the block chain system, and receive information about whether a block corresponding to the certificate exists. When a block corresponding to the authentication certificate does not exist, the certificate of use management unit 233 may process the digital content not to be reproduced. When a block corresponding to the certificate exists, the certificate of right to use management unit 233 may process the digital content to be reproduced on the user terminal.

When a request for determining whether digital content and/or a certificate of right to use digital content is illegally copied is received, the certificate of use management unit 233 may transmit an authentication certificate linked with the certificate of right to use of the digital content, to the block chain system, and receive information regarding whether there is a block corresponding to the authentication certificate, and transmit the information to the user terminal that has requested to determine whether the digital content and/or the certificate of right to use are illegally copied.

When a login request by the user terminal is received, the content list providing unit 234 may provide the user terminal with a listing screen provided by the certificate of the right to use digital content possessed by the user. The content list providing unit 234 may check the validity of the user's account and the validity of the certificate of right to use digital content through a block of a node of the block chain system.

According to the embodiments of the present disclosure, unlimited downloading or copying of digital content without limitation to the amount thereof may be prevented through a block of a block chain.

Figure 3:
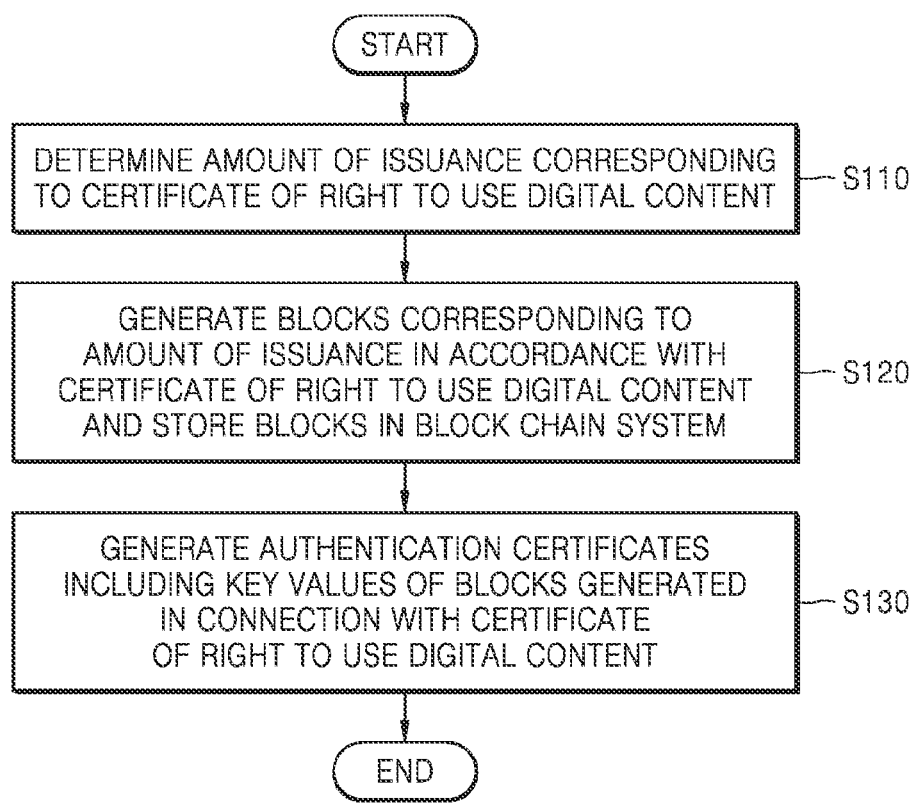
FIG. 3 is a flowchart of a method of creating blocks related to the publication of content.

FIG. 3 is a flowchart of a method of creating blocks related to the publication of content.

In operation S110, a content management server determines an amount of issuance of a certificate of right to use digital content. The amount of issuance may be determined based on information included in an issuance request.

In operation S120, the content management server may generate an amount of issuance of N blocks corresponding to the certificate of right to use digital content and store the blocks in a block chain.

In operation S130, the content management server may generate authentication certificates including key values of the blocks generated in connection with the certificate of right to use digital content. The content management server may receive the key values of the blocks generated in accordance with the certificate of right to use digital content to be issued, and may generate authentication certificates including the received key values of the blocks. The generated authentication certificates may be stored to correspond to the certificate of right to use of the digital content.

Figure 4:
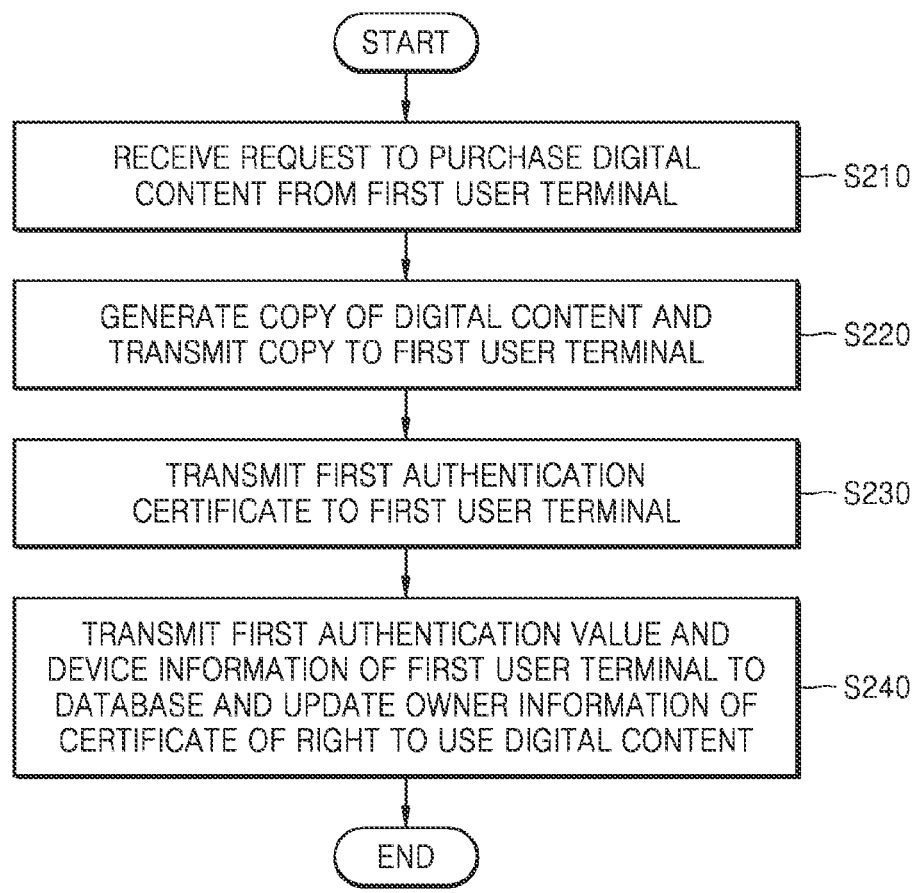
FIG. 4 is a flowchart of a method of processing a purchase request for content.

FIG. 4 is a flowchart of a method of processing a purchase request for content.

In operation S210, the content management server may receive a request to purchase digital content, from a first user terminal.

In operation S220, the content management server may generate a copy of the digital content and transmit the same to the first user terminal. The first user terminal may download the copy of the requested digital content.

In operation S230, the content management server may transmit a certificate of right to use and/or a first authentication certificate related to the digital content, to the first user terminal. The first user terminal may receive the first authentication certificate of a function of verifying the validity of the purchased digital content and store the same. The certificate of right to use of the digital content and the first authentication certificate may be managed in connection with each other.

In operation S240, the content management server may transmit a first authentication value and device information of the first user terminal to a database and update owner information of the certificate of right to use digital content.

When the transfer of ownership is completed according to a purchase request by a user terminal, the content management server may update owner information of the certificate of right to use digital content. The owner information of the digital content may include the first authentication value, the certificate of right to use, and/or the device information of the first user terminal. The first authentication value may be a key value of a corresponding block. The device information of the first user terminal may include a physical address value of the first user terminal or a key value that is randomly generated and set.

Accordingly, in order to distribute digital content in a limited quantity, an authentication certificate is distributed in connection with the certificate of right to use digital content. Only those certificates of right to use digital content, the certificates including a valid authentication certificate may be controlled to be distributed. When an authentication value of the certificate of right to use digital content does not correspond to the key value of the block, the digital content and/or the certificate of right to use may be determined as invalid.

Figure 5:
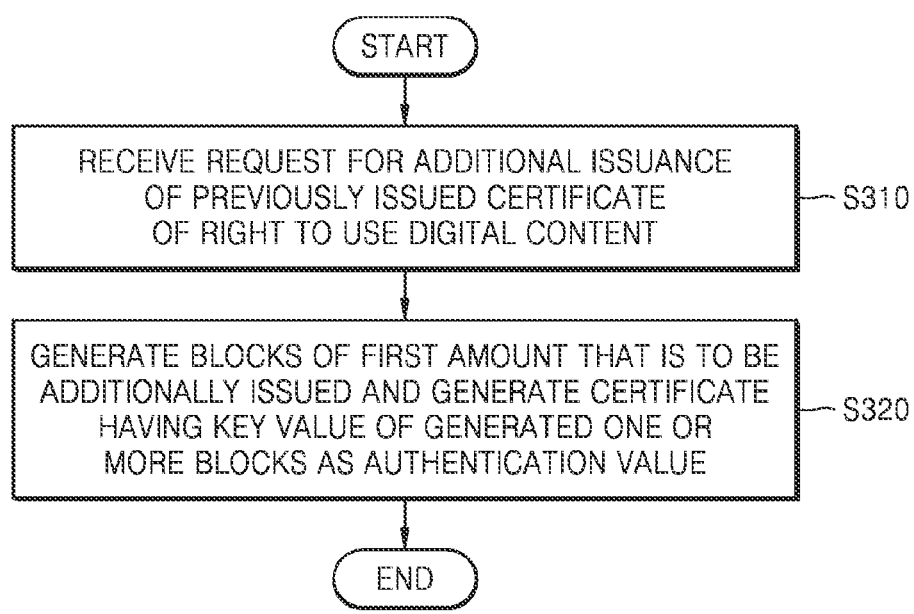
FIG. 5 is a flowchart of a method of processing a request for further publication of digital content.

FIG. 5 is a flowchart of a method of processing a request for further publication of digital content.

As illustrated in FIG. 5, in operation S310, the content management server may receive a request for additional issuance of the previously issued certificate of right to use digital content.

In operation S320, the content management server may generate blocks of a first amount that is to be added according to the request for additional issuance of the certificate of right to use, and generate a certificate having a key value of the generated blocks as an authentication value, and generate a certificate of right to use that is linked with the authentication certificate. The certificate may be a file of a certain format including an authentication value, and may include relation of ownership information of digital content.

Figure 6:
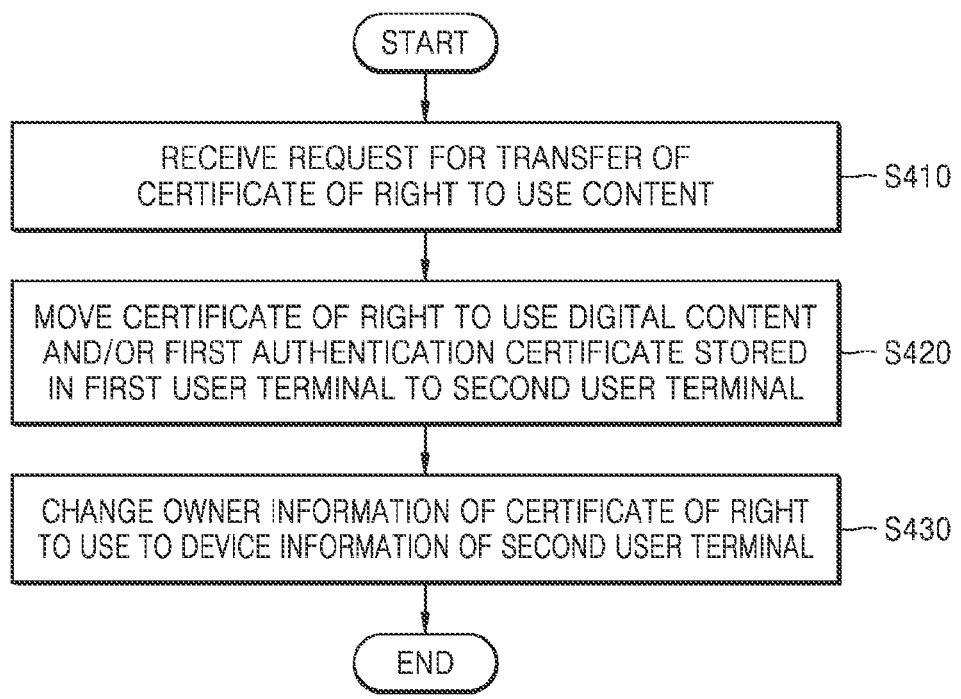
FIG. 6 is a flowchart of a method of processing a request for transfer of a certificate of right to use content.

Accordingly, the certificate of right to use digital content and/or authentication certificates that are copied in a set amount and distributed may be managed through non-falsifiable blocks included in a block chain. The certificate of right to use and/or authentication certificates may be verified by using blocks exceeding 50% of the block chain system. In the block chain system, the number of nodes included therein may be continuously added, and among the nodes of the block chain system including the added nodes, digital content may be stored in blocks of a fixed number of nodes, thereby storing/managing non-falsifiable information. FIG. 6 is a flowchart of a method of processing a request for transfer of a certificate of right to use content.

As illustrated in FIG. 6, in S410, the content management server may receive a request for transfer of a certificate of right to use content.

Here, the transfer request is to change the owner of the certificate of right to use digital content, and may include information of a transferor and a transferee of the certificate of right to use. The certificate of right to use may have the owner's information changed to the transferee's information.

In S420, the content management server may move the certificate of right to use digital content and/or the first authentication certificate stored in the first user terminal to a second user terminal. Under the control by the content management server, the certificate of right to use digital content and/or the authentication certificate may be transferred to the transferee's terminal. The content management server, may determine the validity of the certificate of right to use digital content, the certificate being transferred according to the change to the owner information. When the certificate of right to use is determined to be that of valid digital content, the content management server may transmit, to the second user terminal, the digital content and/or the certificate of right to use of the digital content, and an authentication certificate linked with the certificate of right to use of the digital content. The certificate of right to use digital content and/or the first authentication certificate stored in the first user terminal may be processed to be removed.

In S430, the content management server changes the owner information of the certificate of right to use, to device information of the second user terminal.

By using the content management server that processes movement of certificates of right to use digital content, the certificates of right to use digital content and/or authentication certificates may be prevented from being copied and transmitted. The digital content may be designed to be stored in a form that cannot be reproduced and to be reproduced only when the digital content is reproduced through access to the content management server.

Figure 7:
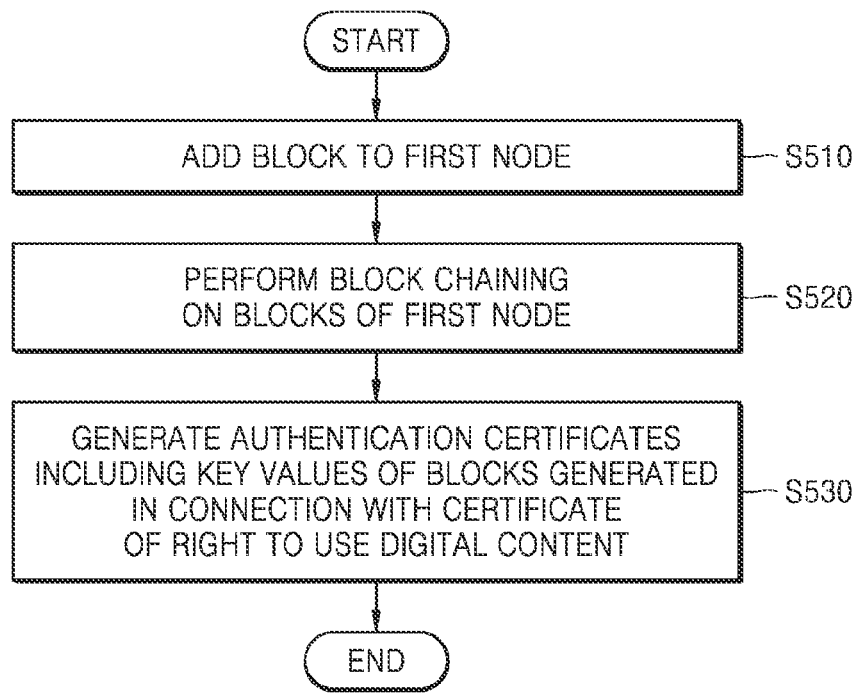
FIG. 7 is a flowchart of a method of adding a block to a first node of the block chain system.

FIG. 7 is a flowchart of a method of adding a block to a first node of the block chain system.

As illustrated in FIG. 7, in S510, the content management server may add a block to a first node of the block chain system in conjunction with the block chain system in order to distribute just an amount of issuance of the certificate of right to use digital content.

The content management server may control to add a block to the first node corresponding to the digital content. When a block cannot be added to the first node, the block chain system may create a new node and add a block to the created node.

In S520, the block chain system performs block chaining on blocks of the first node.

In S530, the content management server receives a key value of a block from any one node of the block chain system, and generates authentication certificates including key values of blocks generated in connection with the certificate of right to use digital content.

Figure 8:
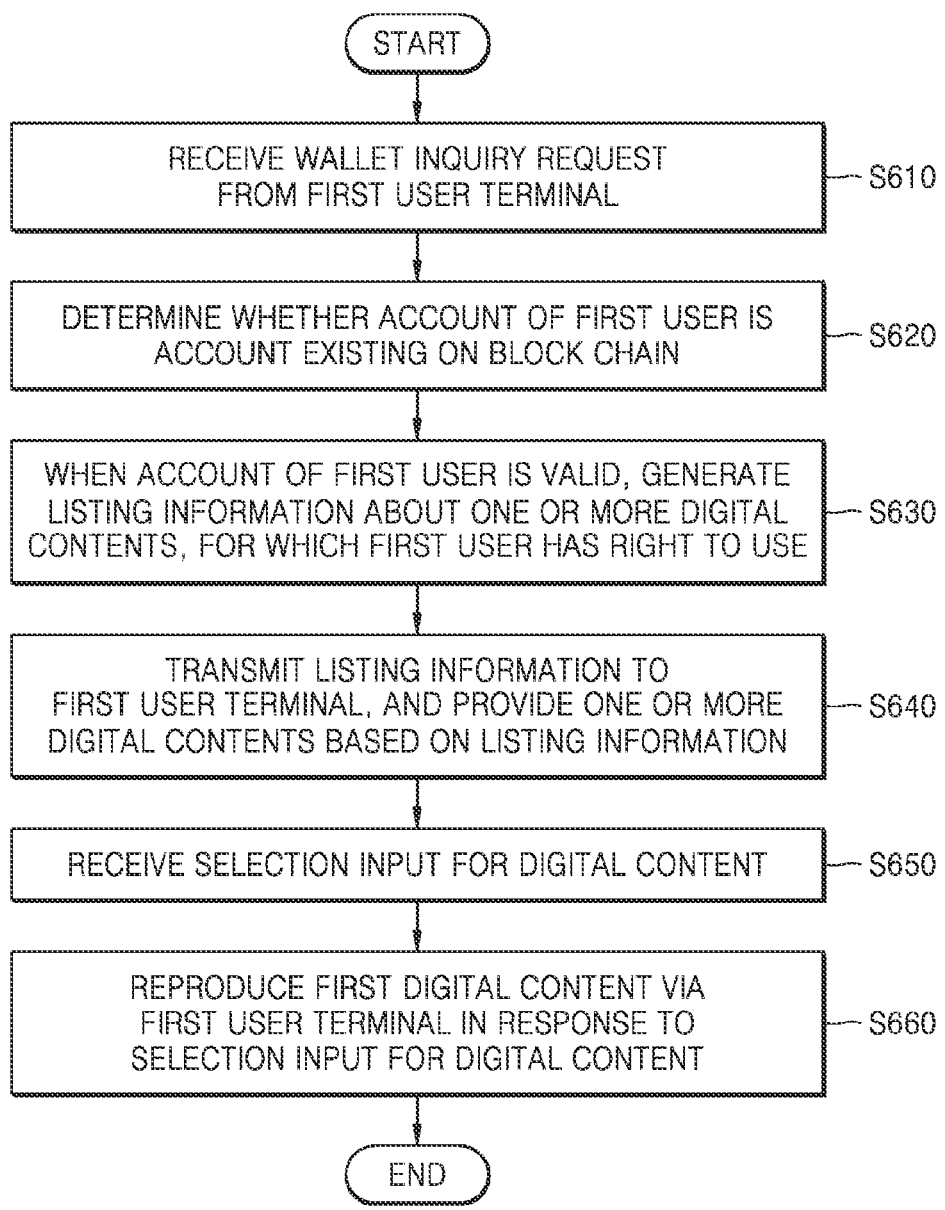
FIG. 8 is a flowchart of a method of processing a wallet inquiry request.

FIG. 8 is a flowchart of a method of processing a wallet inquiry request.

As illustrated in FIG. 8, in S610, the content management server receives a wallet inquiry request from the first user terminal.

In S620, the content management server may determine the validity of an account of a first user. The content management server may determine whether the account of the first user is an account existing on the block chain. The existence of an account on a block chain may indicate that there is a block corresponding to the account or a block corresponding to code of the account. The content management server may inquire of an arbitrary node of the block chain about the existence of a block corresponding to the account of the first user or the existence of a block corresponding to the code of the account to an arbitrary node of the block chain, and may determine the validity of the account of the first user based on the existence of the block.

In S630, when there is a block corresponding to the account and the account of the first user is valid, the content management server may search for a certificate of right to use, to which the first user has the right to use, and generate listing information about one or more digital contents corresponding to the certificate of right to use. The content management server may determine the validity of the certificate of right to use of one or more digital contents included in the listing information and change the listing information to include one or more valid digital contents linked with the valid certificate of right to use.

In S640, the content management server may transmit the listing information to the first user terminal, and control the first user terminal to provide one or more digital contents based on the listing information of the digital content.

In S650, the content management server may receive a selection input for digital content. In S660, the content management server may control the first digital content selected in response to the selection input for digital content, to be reproduced via the first user terminal.

Figure 9:
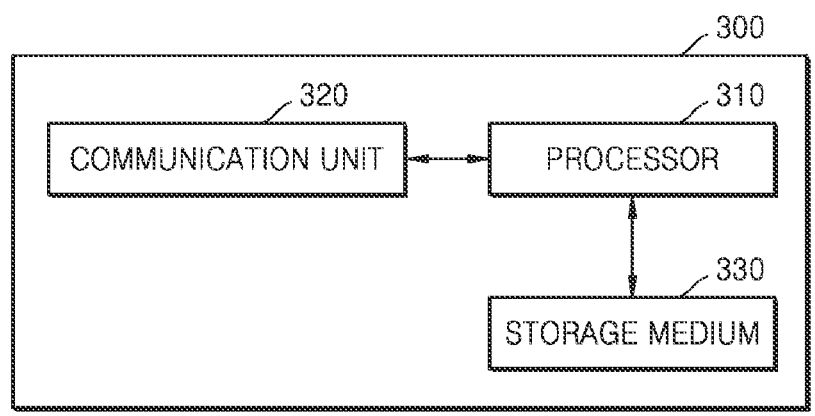
FIG. 9 is a block diagram of a user terminal according to embodiments of the present disclosure.

FIG. 9 is a block diagram of the user terminal 300 according to embodiments of the present disclosure.

The user terminal 300 illustrated in FIG. 9 may include a communication unit 320, a storage medium 330, and a processor 310. However, not all illustrated components are essential components. The user terminal 300 may be implemented by more components than the illustrated components, and the user terminal 300 may be implemented by fewer components than the illustrated ones. Hereinafter, the components will be described.

According to some embodiments, the communication unit 320 may communicate with an external device. In detail, the communication unit 320 may be connected to a network in a wired or wireless manner to communicate with an external device. The external device may include nodes on a block chain network, the content management server 200.

The communication unit 320 may include a communication module which supports one of various wired and wireless communication methods. The communication module may be a short-range communication module or a wired communication module.

According to some embodiments, the storage medium 330 may include at least one type of storage medium among a flash memory type, a hard disk type, a multimedia card micro type, a card type memory (SD, XD memory, etc.), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, a magnetic disk, and an optical disk. The storage medium 330 may store at least one program for executing a content management method in a computer. At least one program stored in the storage medium 330 may be classified into a plurality of modules according to functions.

According to some embodiments, the processor 310 controls the overall operation of the user terminal 300, and may include at least one processor such as a CPU. The processor 310 may include at least one specialized processor corresponding to each function or may be an integrated processor.

According to some embodiments, the processor 310 may execute a program stored in the storage medium 330, read data or files stored in the storage medium 330, or store a new file in the storage medium 330. Also, the processor 310 may execute instructions stored in the storage medium 330.

The processor 310 may receive, from the content management server 200, digital content, certificate of right to use of the digital content, and/or an authentication certificate and store the same in a content folder. The processor 310 may perform an operation according to data transmission or reception to or from the content management server 200.

Figure 10:
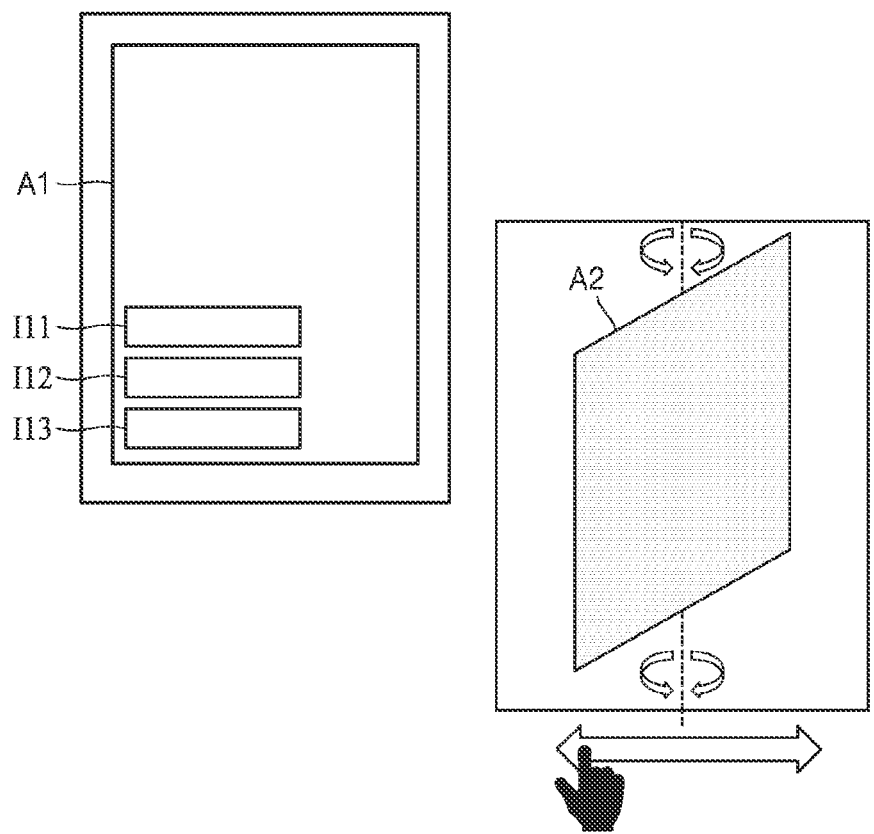
FIG. 10 is exemplary diagrams of first user interface provided according to embodiments of the present disclosure.

FIG. 10 is exemplary diagrams of first user interface provided according to embodiments of the present disclosure.

A certificate of right to use digital content may be implemented in a card form having a front side and a back side. The certificate of right to use digital content may be rotated from a front side A1 to a back side A2 and from the back side A2 to the front side A1, with a flip effect that the certificate is rotated and turned in response to a user input such as a touch. The back side of the certificate of right to use digital content may include information of actual content (sound source, video, image, etc.).

The front side A1 of the certificate of right to use digital content may include a representative image of the content, and the representative image may be implemented in a form including an effect that cannot be copied with a capture function, and may be, for example, a form of a moving image.

Figure 11:
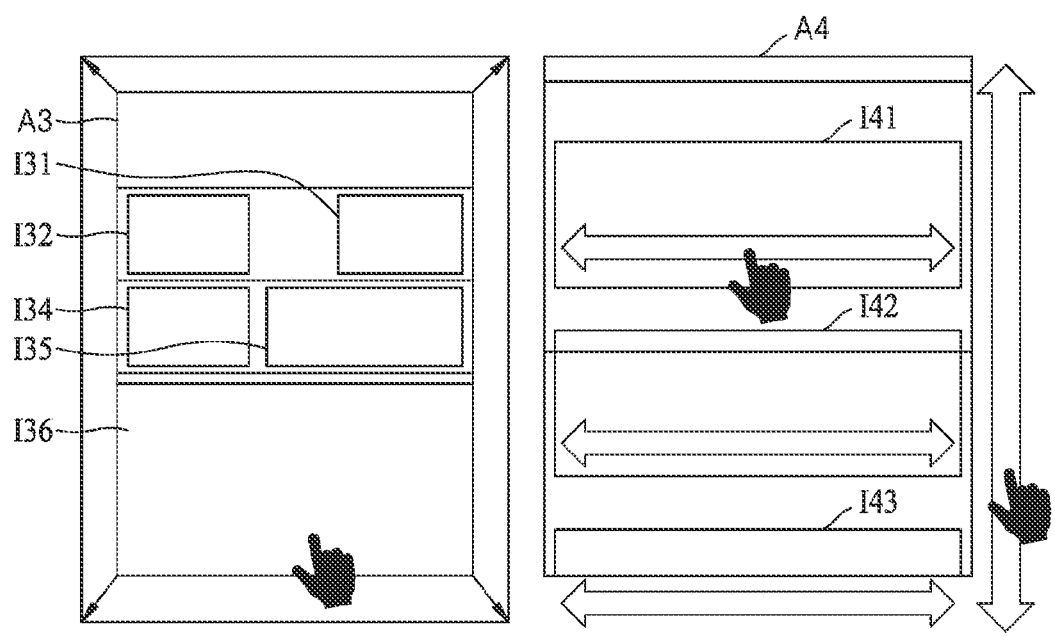
FIG. 11 is exemplary diagrams of second user interface provided according to embodiments of the present disclosure.

FIG. 11 is exemplary diagrams of second user interface provided according to embodiments of the present disclosure.

A back side A3 of the certificate of right to use digital content may include a plurality of areas, as illustrated in FIG. 11.

The back side A3 of the certificate of right to use digital content may include a banner area 131 for expressing title information, an area 132 for displaying the artist name or work name, a code area 133 for navigating to a page providing a digital coupon linked with the certificate of right to use digital content, a representative icon area 134 related to the artist or work name of each digital content, an area 135 for displaying information such as the genre and publisher of each digital content, and an area 136 for displaying list information of one or more digital contents of certificates of right to use, for which permission to use the same is owned by a certain person.

In response to a selection input for the area 136 of the back side A3 of the certificate of right to use digital content, a content providing screen A4 may be displayed.

The content providing screen A4 may be implemented such that a display area of digital content of the certificate of right to use is changed in response to a left or right sliding input. The content providing screen A4 may sequentially arrange and display one or more digital contents of the certificate of right to use. When a horizontal size (of exceeds a display screen, the display area may be changed by a left or right sliding input.

Figure 12:
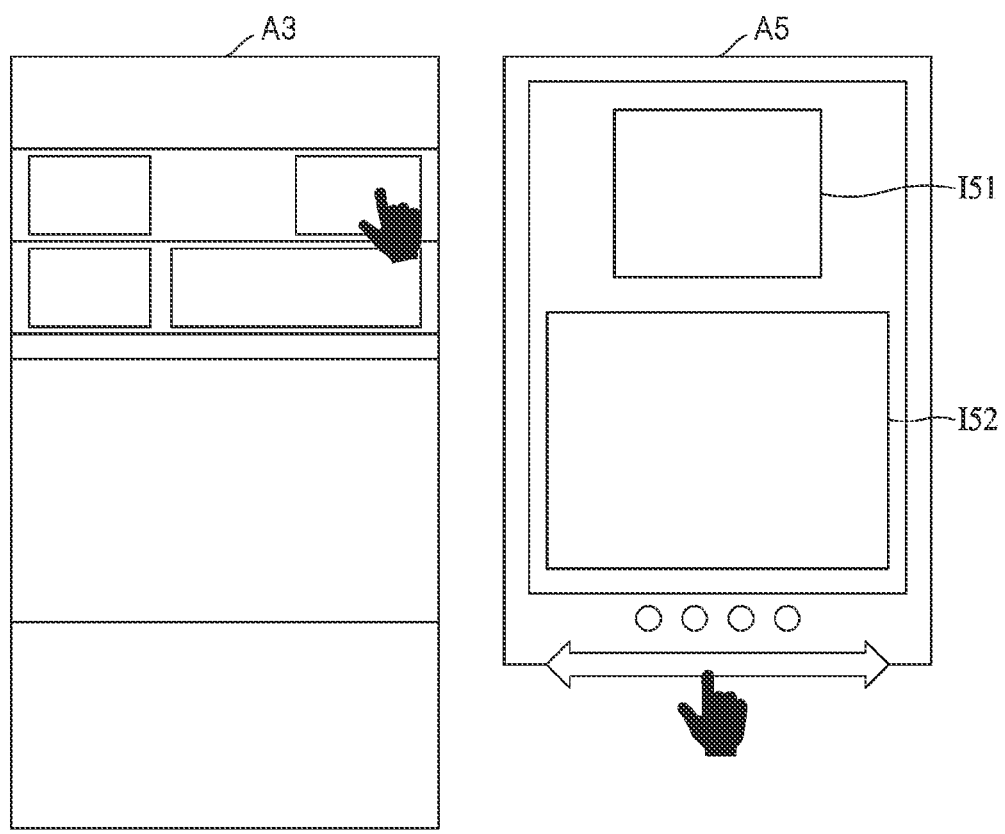
FIG. 12 is exemplary diagrams of a back side of the certificate of right to use digital content provided according to embodiments of the present disclosure.

FIG. 12 is exemplary diagrams of a back side of the certificate of right to use digital content provided according to embodiments of the present disclosure.

On the back side A3 of the certificate of right to use digital content, when a selection input for the code area 133 is received, an area 151 for providing a code corresponding to a digital coupon linked with the certificate of right to use digital content, and a description area 152 where details of the coupon are described may be provided.

Information such as details of services and products, details and a range of what is to be provided through the services and products, and restrictions and a validity period of the services and products may be provided via the description area 152. The digital coupon used may be provided with a distinguishing visual effect. The digital coupon used by the certificate of right to use digital content may be removed from the digital content.

The server or terminal described above may be implemented as a hardware component, a software component, and/or a combination of the hardware component and the software component. For example, the server, the terminal and components described in the embodiments may be implemented using one or more general purpose or special purpose computers such as a processor, a controller, an ALU (arithmetic logic unit), a digital signal processor, a microcomputer, a FPGA (field programmable gate array), a PLU (programmable logic unit), a microprocessor, or any other device capable of executing and responding to instructions. The processing device may execute an operating system (OS) and one or more software applications running on the operating system. The processing device may also access, store, manipulate, process, and generate data in response to execution of the software. For convenience of understanding, although one processing device is sometimes described as being used, one of ordinary skill in the art will recognize that the processing device may include a plurality of processing elements and/or a plurality of types of processing elements. For example, the processing device may include a plurality of processors or one processor and one controller. Other processing configurations, such as parallel processors are also possible.

The software may include a computer program, code, instructions, or a combination of one or more of the foregoing, and may configure the processing device so that the processing device can operate as intended, or to independently or collectively give instructions to the processing device. The software and/or the data may be permanently or temporarily embodied in any type of machine, component, physical device, virtual equipment, computer storage media or devices, or transmitted signal waves, such that the software and/or the data is interpreted by the processing apparatus or provides an instruction or data to the processing device. The software may be distributed over a networked computer system and stored or executed in a distributed manner. The software and the data may be stored on one or more computer readable recording media.

The method according to the embodiment may be embodied in the form of program instructions that can be executed through various computer means and recorded in a computer-readable medium. The computer-readable medium may include program instructions, data files, data structures, and the like separately or in combinations. The program instructions to be recorded on the computer-readable recording medium may be specially designed and configured for the embodiments or may be well-known to and available to one of ordinary skill in the art of computer software. Examples of the computer-readable recording medium include magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program instructions (e.g., ROM, RAM, flash memories, etc.). Examples of the program instructions are advanced language codes that can be executed by a computer by using an interpreter or the like as well as machine language codes made by a compiler. The hardware devices can be configured to function as one or more software modules so as to perform operations according to examples, or vice versa.

While the embodiments have been particularly shown and described with reference to examples thereof, it will be understood by those of ordinary skill in the art that various changes in form and details may be made therein without departing from the spirit and scope of the present disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

Therefore, other implementations, other embodiments, and equivalents to the claims are also within the scope of the following claims.

The invention claimed is:

1. A method of distributing a certificate of right to use digital content as much as an amount of issuance, the method comprising:
determining, by a content management server, the amount of issuance of the certificate of right to use digital content;
accessing, by the content management server, a block chain system to generate blocks as many as the amount of issuance corresponding to the amount of issuance in accordance with the certificate of right to use the digital content through the block chain system and to add the blocks to the block chain system;
receiving, by the content management server, data including key values of the generated blocks as many as the amount of issuance;
generating, by the content management server, authentication certificates including each key value as many as the amount of issuance in connection with the digital content;
receiving, by the content management server, from a first user terminal a request to load a digital content;
receiving, by the content management server, first authentication certificate linked with the certificate of right to use digital content from the first user terminal such that the digital content is stored in a content folder of the first user terminal;
transmitting, by the content management server, the first authentication certificate to the block chain system;
receiving, by the content management server, information about whether first block corresponding to the first authentication certificate exists in the block chain system and determining a validity of the digital content stored in the first user terminal using the information; and
providing, by the content management server, a screen displaying a display area of digital content of the certificate of right to use when the first block exists or processing the digital content not to be played when the first block does not exist.

2. The method of claim 1, comprising, when a request for increasing the amount of issuance by a first amount is received,
repeatedly generating a block corresponding to the authentication certificate of the certificate of right to use the digital content by the first amount, and generating one or more authentication certificates having a key value of the generated one or more blocks as an authentication value.

3. The method of claim 1,
comprising, in response to a request to move the certificate of right to use of the digital content from the first user terminal to a second user terminal,
moving the digital content, the certificate of right to use of the digital content, and the first authentication certificate stored in the first user terminal to the second user terminal, and
changing owner information of the certificate of right to use to device information of the second user terminal.

4. The method of claim 1, comprising generating blocks corresponding the amount of issuance the certificate of right to use the digital content and synchronizing the generated block information on a distribution system by changing a state of the generated blocks to general blocks.

5. A content management server comprising: a processor; a storage medium; and a communication unit, wherein the processor is configured to:
determine an amount of issuance a certificate of right to use digital content;
access a block chain system to generate blocks as many as the amount of issuance corresponding to the amount of issuance in accordance with the certificate of right to use the digital content through the block chain system and to add the blocks to the block chain system;
receive data including key values of the generated blocks as many as the amount of issuance;
generate authentication certificates including each key value as many as the amount of issuance in connection with the certificate of right to use the digital content;
receive, from a first user terminal, a request to load a the digital content;
receive first authentication certificate linked with the certificate of right to use digital content from the first user terminal such that the digital content is stored in a content folder of the first user terminal;
transmit the first authentication certificate to the block chain system;
receive information about whether first block corresponding to the first authentication certificate exists in the block chain system and determine a validity of the digital content stored in the first user terminal using the information; and provide a screen displaying a display area of digital content of the certificate of right to use when the first block exists or processing the digital content not to be played when the first block does not exist.

6. The content management server of claim 5, wherein the processor is further configured to:

when a request for increasing the amount of issuance by the first amount is received, repeatedly generate a block corresponding to the authentication certificate of the certificate of right to use the digital content by the first amount, and generate one or more authentication certificates having a key value of the generated one or more blocks as an authentication value.

7. The content management server of claim 5, wherein the processor is further configured to, in response to a request to move the certificate of right to use the digital content from the first user terminal to a second user terminal, move the digital content, the certificate of right to use the digital content and the first authentication certificate stored in the first user terminal to the second user terminal, and change owner information of the certificate of right to use to device information of the second user terminal.

8. The content management server of claim 5, wherein the processor is further configured to generate blocks corresponding to the amount of issuance of the certificate of right to use the digital content and synchronize the generated block information on a distribution system by changing a state of the generated blocks to general blocks.

9. A non-transitory computer-readable storage medium storing instructions that, when executed by a processor, causes the processor to perform operations comprising:

determining the amount of issuance of the certificate of right to use digital content;

accessing a block chain system to generate blocks as many as the amount of issuance corresponding to the amount of issuance in accordance with the certificate of right to use the digital content through the block chain system and to add the blocks to the block chain system;

receiving data including key values of the generated blocks as many as the amount of issuance;

generating authentication certificates including each key value as many as the amount of issuance in connection with the digital content;

receiving from a first user terminal a request to load a digital content;

receiving first authentication certificate linked with the certificate of right to use digital content from the first user terminal;

transmitting the first authentication certificate to the block chain system;

receiving information about whether first block corresponding to the first authentication certificate exists in the block chain system and determining a validity of the digital content stored in the first user terminal using the information; and providing a screen displaying a display area of digital content of the certificate of right to use when the first block exists or processing the digital content not to be played when the first block does not exist.

* * * * *